(12) United States Patent
Adhikari

(10) Patent No.: US 8,956,230 B2
(45) Date of Patent: Feb. 17, 2015

(54) HAPTIC DEVICE FOR 3-D GAMING

(75) Inventor: Suranjit Adhikari, San Diego, CA (US)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 13/112,860

(22) Filed: May 20, 2011

(65) Prior Publication Data

US 2012/0295709 A1   Nov. 22, 2012

(51) Int. Cl.
*G06F 17/00* (2006.01)
*A63F 13/20* (2014.01)
*G06F 3/0354* (2013.01)

(52) U.S. Cl.
CPC ............. *A63F 13/06* (2013.01); *G06F 3/03545* (2013.01); *A63F 2300/1037* (2013.01); *A63F 2300/1043* (2013.01); *A63F 2300/105* (2013.01); *A63F 2300/1056* (2013.01)
USPC ............................................ 463/37; 345/179

(58) Field of Classification Search
CPC .. G06F 3/016; G06F 3/03545; G06F 3/03546
USPC ............................... 463/36–39; 345/167, 179
See application file for complete search history.

(56) References Cited

U.S. PATENT DOCUMENTS

| | | | |
|---|---|---|---|
| 5,726,684 A * | 3/1998 | Blankenship et al. | ......... 345/167 |
| 6,084,587 A | 7/2000 | Tarr et al. | |
| 6,088,020 A | 7/2000 | Mor | |
| 6,693,622 B1 | 2/2004 | Shahoian et al. | |
| 6,819,312 B2 | 11/2004 | Fish | |
| 6,879,315 B2 | 4/2005 | Guy et al. | |
| 7,113,166 B1 | 9/2006 | Rosenberg et al. | |
| 7,119,789 B1 | 10/2006 | Shaw et al. | |
| 7,161,580 B2 | 1/2007 | Bailey et al. | |

(Continued)

FOREIGN PATENT DOCUMENTS

| CN | 1177412 A | 3/1998 |
|---|---|---|
| CN | 102027437 A | 4/2011 |

(Continued)

OTHER PUBLICATIONS

Description of the Sony DualShock® at http://en.wikipedia.org/wiki/DualShock.

(Continued)

*Primary Examiner* — David L Lewis
*Assistant Examiner* — Robert Mosser
(74) *Attorney, Agent, or Firm* — Fitch, Even, Tabin & Flannery LLP

(57) ABSTRACT

A system, method, and computer program product for automatically providing a haptic stylus based interface for enhanced user interaction with touch screen devices are disclosed. The stylus communicates with the touch screen device to report stylus operating information from onboard sensors, and to receive application program instructions defining feedback and friction forces to be applied by onboard actuators. The applied feedback and friction forces may be independently controlled. Friction forces are provided via a rolling contact ball gripping mechanism that mimics varying physical engagement between the contact ball and a touch screen display surface by controlling the relative rotational freedom of the contact ball. Embodiments of the invention enable a haptic stylus to mimic three-dimensional interactions for gaming, object manipulation and sculpting, and non-contact proximity-based stylus operation scenarios.

19 Claims, 4 Drawing Sheets

(56) References Cited

U.S. PATENT DOCUMENTS

| | | |
|---|---|---|
| 7,265,750 B2 | 9/2007 | Rosenberg |
| 7,307,619 B2 | 12/2007 | Cunningham et al. |
| 7,432,910 B2 | 10/2008 | Shahoian |
| 7,499,021 B2 | 3/2009 | Bailey |
| 7,508,382 B2 | 3/2009 | Denoue et al. |
| RE40,808 E | 6/2009 | Shahoian et al. |
| 7,602,384 B2 | 10/2009 | Rosenberg et al. |
| 7,663,604 B2 * | 2/2010 | Maruyama et al. ........... 345/173 |
| 7,710,399 B2 | 5/2010 | Bruneau et al. |
| 7,765,182 B2 | 7/2010 | Peurach et al. |
| 7,825,903 B2 | 11/2010 | Anastas et al. |
| RE42,064 E | 1/2011 | Fish |
| 8,681,130 B2 | 3/2014 | Adhikari |
| 2005/0248549 A1 * | 11/2005 | Dietz et al. .................... 345/179 |
| 2006/0033707 A1 | 2/2006 | Rodomista |
| 2007/0236450 A1 | 10/2007 | Colgate et al. |
| 2008/0291161 A1 | 11/2008 | Massie |
| 2009/0135149 A1 | 5/2009 | Taniuchi |
| 2011/0267318 A1 * | 11/2011 | Knee .............................. 345/179 |
| 2012/0268412 A1 | 10/2012 | Cruz-Hernandez et al. |
| 2012/0293415 A1 | 11/2012 | Adhikari |
| 2012/0293463 A1 | 11/2012 | Adhikari |
| 2012/0293464 A1 | 11/2012 | Adhikari |
| 2013/0044049 A1 | 2/2013 | Biggs et al. |

FOREIGN PATENT DOCUMENTS

| | | | |
|---|---|---|---|
| KR | 1020090030594 | 3/2009 | |
| WO | WO 2010/105011 | * 9/2010 | .............. G06F 3/041 |

OTHER PUBLICATIONS

USPTO; Office Action issued in U.S. Appl. No. 13/112,932, mailed Nov. 21, 2012, 10 pages.

USPTO; Office Action issued in U.S. Appl. No. 13/112,797, mailed Feb. 5, 2013, 13 pages.

USPTO; Office Action issued in U.S. Appl. No. 13/112,909, mailed Apr. 23, 2013, 11 pages.

USPTO; Final Office Action issued in U.S. Appl. No. 13/112,932, mailed Jun. 13, 2013, 8 pages.

USPTO; Notice of Allowance issued in U.S. Appl. No. 13/112,797, mailed Jul. 11, 2013, 8 pages.

USPTO; Notice of Allowance issued in U.S. Appl. No. 13/112,932, mailed Jan. 16, 2014, 7 pages.

Notice of Allowance from U.S. Appl. No. 13/112,909 mailed Jan. 30, 2014 (13 Pages).

USPTO; Notice of Allowance issued in U.S. Appl. No. 13/112,932, mailed Feb. 26, 2014, 5 pages.

USPTO; Notice of Allowance issued in U.S. Appl. No. 13/112,909, mailed Feb. 26, 2014, 9 pages.

USPTO; Final Office Action issued in U.S. Appl. No. 13/112,909, mailed Jul. 31, 2013, 7 pages.

USPTO; Advisory Action issued in U.S. Appl. No. 13/112,932, mailed Aug. 12, 2013, 3 pages.

USPTO; Notice of Allowance issued in U.S. Appl. No. 13/112,797, mailed Aug. 29, 2013, 9 pages.

USPTO; Notice of Allowance issued in U.S. Appl. No. 13/112,932, mailed Sep. 26, 2013, 8 pages.

USPTO; Notice of Allowance issued in U.S. Appl. No. 13/112,909, mailed Oct. 17, 2013, 11 pages.

USPTO; Notice of Allowance issued in U.S. Appl. No. 13/112,797, mailed Dec. 20, 2013, 8 pages.

Chinese Patent Office; First Office Action issued in Chinese Patent Application No. 20120142481.0, dated Oct. 28, 2014, 17 pages (includes English translation).

* cited by examiner

HAPTIC DEVICE FOR 3-D GAMING

CROSS-REFERENCE TO RELATED APPLICATIONS

This application is related to three other simultaneously-filed applications, all with a common specification, including U.S. Ser. No. 13/112,797 entitled "Stylus Based Haptic Peripheral for Touch Screen and Tablet Devices", U.S. Ser. No. 13/112,909 entitled "Haptic Device for Carving and Molding Objects", and U.S. Ser. No. 13/112,932 entitled "Haptic Device for Position Detection", each of which is hereby incorporated by reference in its entirety. Commonly-assigned patent application U.S. Ser. No. 12/948,472 filed on Nov. 17, 2010, is also hereby incorporated by reference in its entirety.

FIELD OF THE INVENTION

The present patent document relates in general to input devices for computing environments, more specifically to hand-held stylus-type tools for interfacing with touch screen devices.

BACKGROUND OF THE INVENTION

Touch screen devices are becoming more common, being used currently for example in cellular telephones, digital cameras, personal digital assistants (PDAs) and other hand-held computing or gaming devices. Touch screen user interfaces typically combine a display unit capable of depicting visual output with an overlying touch sense unit capable of detecting user input via touch. Touch screens lack some of the functionality of more conventional input devices, so many also include a stylus for inputting data and/or navigating a user interface. Stylus devices for use with portable touch screens have become very familiar to a broad user base.

Haptic devices employ tactile feedback technology that takes advantage of a user's sense of touch by conveying physical force sensations to the user. The resulting vibration or motion can be employed to enhance the user's perception of information being presented by a computer. Such haptic devices are used for example in video game controllers (e.g. the Sony PS3 DualShock®), and complex 3-D editing tools for computer-aided design systems. The use of haptic peripherals with portable touch screen computing devices has not become widespread to date, though.

As a result, there is a need for a haptic hand-held stylus interface tool to improve the interaction between users and their portable touch screen computing devices.

SUMMARY OF THE EMBODIMENTS

A system, method, and computer program product for haptic interaction with a touch screen display are disclosed and claimed herein. The embodiments generally assist a user by more convincingly simulating the manipulation of objects depicted on the display.

Embodiments of a haptic stylus interface device may comprise a stylus capable of providing feedback forces and having a contact ball capable of rotating in place, a communications module enabling information transfer with a computer, and a contact ball gripping mechanism that responsively produces a variable contact ball friction force independent of the feedback forces. The device may further comprise at least one sensor that measures operational data including at least one of position, orientation, velocity, acceleration, and rotation. The sensor may include at least one of a gyroscope, an accelerometer, and a contact pressure sensor.

The device may further comprise a feedback actuator that selectively produces the feedback forces oriented with respect to a housing, either longitudinally or orthogonally, or some combination of the two. The feedback actuator may press a contact pad against the contact ball for transmission of feedback forces. The contact pad may be slick or frictional in nature. The device may be inverted for use as a trackball.

The communications module, preferably a Bluetooth module, includes control circuitry that gathers the operational data for transmission, and receives control information enabling responsive actuator activation. Driver software executing on the computer manages the operational data and the control information for an application executing on the computer. The device may transfer information by wire or wirelesssly. The contact ball may roll against the operating surface of a touch screen display.

The contact ball gripping mechanism may comprise a set of prongs holding the contact ball in a grip of variable firmness, including completely stopping contact ball rotation. The various components of the device may be placed in a housing or handle that may be cylindrical or conical in shape, with the contact ball and contact ball gripping mechanism preferably at the larger end of the cone. The stylus may include conventional user input devices as well, including a button, a knob, a wheel, and a sliding switch for example.

Alternate embodiments may include a computer interface for providing interaction between a computer and a user, comprising a computer and a haptic stylus that communicates electronically with the computer and provides independent feedback and friction surface contact forces to a user. The invention may also be embodied as a method for providing interaction between a computer and a user, comprising transferring information between a computer and a stylus having a contact ball capable of rotating in place, and selectively providing independent feedback and friction forces to a user with the stylus. Finally, the invention may be embodied as a computer program product comprising a machine-readable medium tangibly embodying non-transitory program instructions thereon that, when executed by a computer, cause the computer to transfer information between a computer and a stylus having a contact ball capable of rotating in place, and selectively provide independent feedback and friction forces to a user with the stylus.

Further, embodiments may enable a gaming interface that helps a user interact with a game program executing on the computer, by simulating game objects or characters. In this case, the effort applied by the user is determined from stylus pressure or stylus motion against the friction force, for example. Excess stylus pressure may damage the touch screen display, so a warning may be given should this eventuality be detected. Rotary motion of the stylus may trigger a predetermined game event. Sudden changes in the friction force may indicate particular game events; likewise a steady increase in the friction force may indicate that a game character is fatigued or damaged.

Embodiments of the invention may enable sculpting operations on virtual or real objects by selectively adding or removing object material. In this case, the application program executing on the computer is a sculpting or three-dimensional CAD application. The friction force may provide information to the user regarding the object's properties, e.g. different regions of the object may have their own friction characteristics. For example, embedded knots or hard objects may be modeled by a sudden increase in the friction force when they are encountered by a manipulation tool or sculpting implement. Similarly, softer or empty regions such as voids may be modeled by a sudden decrease in the sculpting implement friction force. Objects may have directional friction properties as well, used to model wood grain for example, or to help beginning sculptors recognize regions to be shaved away to produce a desired object. Overcoming various friction forces and/or exerting stylus contact pressure are ways for the user to specify an effort level when sculpting, which may control the amount of material being manipulated. Finally, the stylus system may take advantage of a proximity detecting tool that determines the distance from the contact ball to its contact surface, typically the operating surface of a touch screen display.

As described more fully below, the apparatus and processes of the embodiments disclosed permit automatic haptic interaction with a touch screen display. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

DETAILED DESCRIPTION OF EXEMPLARY EMBODIMENTS

Figure 1:
FIG. 1 depicts a prior art stylus and handheld portable touch screen electronic device.

Referring now to FIG. 1, a prior art stylus and handheld portable electronic device with a touch screen display are shown. The stylus is not a haptic device in this instance. The stylus provides a convenient handle for grasping, as well as a precise point of contact with the portable electronic device's touch screen display. In essence, it is merely a more precise version of a user's finger. Such a stylus is typically housed inside the portable electronic device when not in use.

Figure 2:
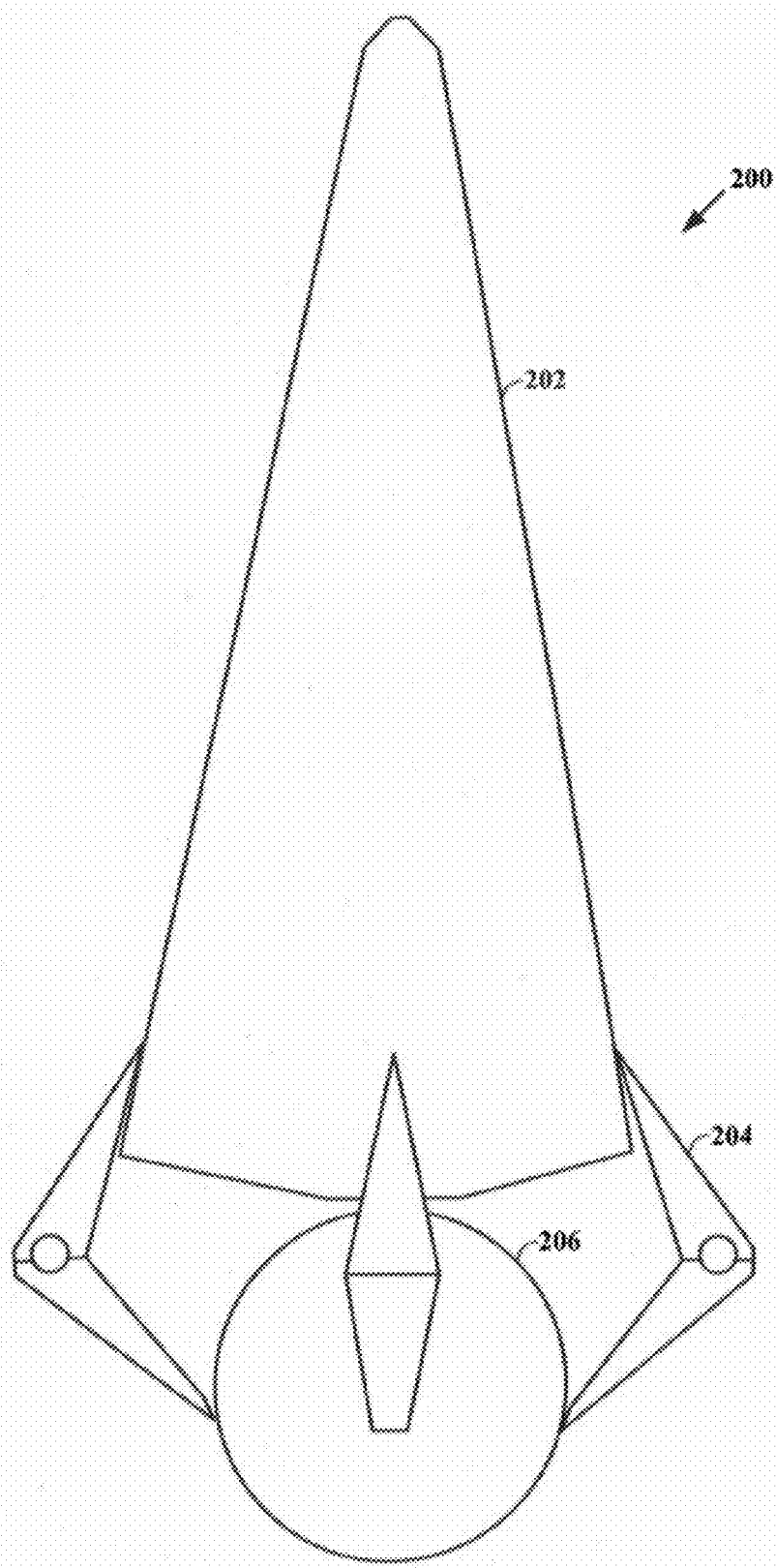
FIG. 2 depicts a stylus according to an embodiment of the present invention.

Referring now to FIG. 2, stylus 200 is shown, according to an embodiment of the present invention. In this embodiment stylus 200 includes a conical housing 202, though other embodiments may employ alternately shaped housings, e.g. cylindrical. Housing 202 is designed to serve as a familiar and effective handle for a user to grasp during manipulation of the stylus. This embodiment also includes a contact ball 206 capable of rotating in place, and a contact ball gripping mechanism including for example a group of prongs 204 moved by a friction force actuator (not shown). Any type of actuator may be employed; a wide variety of electromechanical actuators are known in the art for example. Note that contact ball 206 is shown protruding extensively from housing 202 for clarity in this patent application, but generally may be much closer to housing 202 and/or partially contained within a spherical indentation of housing 202.

During operation, the user holds the stylus housing 202 by hand and presses contact ball 206 against a surface, such as the smooth surface of a touch screen display. The contact point between contact ball 206 and the touch screen display surface is determined in that case by the touch screen display circuitry, as with a conventional stylus. The user may easily move contact ball 206 around on the surface, as contact ball 206 is normally not constrained in its rotation; its distance from housing 202 does not usually vary noticeably though.

However, the contact ball gripping mechanism may selectively apply a controllable gripping force to contact ball 206 to provide haptic features. The friction force actuator varies the mechanical gripping linkage between for example housing 202 and contact ball 206, to control the contact ball's relative freedom of movement. In other words, prongs 204 may selectively loosen or tighten their effective grip on the contact ball. The prongs shown are hinged, but unhinged prongs may also be employed.

This braking feature controls the frictional drag between contact ball 206 and the rest of stylus 200. The result is that additional force is required from the user to overcome the friction between prongs 204 and contact ball 206. This friction is however generally intuitively interpreted by the user as being between contact ball 206 and the touch screen surface, even though such a surface may be quite slick.

The contact ball gripping mechanism may even completely stop contact ball 206 rotation, so that the force required to drag contact ball 206 across the display screen surface is maximized. Contact ball 206 is thus preferably made of an elastomeric material for more effective gripping and dragging, though that is not a required limitation. As shown, four prongs 204 may be employed, though any number may suffice; a single retracting ring, a pair of retracting semi-circular or arc-shaped prongs, or three symmetrically arranged prongs 204 for example (not shown) are all within the scope of the invention as they retain contact ball 206 and influence its freedom of rotation.

Stylus 200 may also be inverted to serve as a trackball, wherein the user manipulates a possibly larger contact ball 206 directly, against the friction force that may be generated as described. Stylus 200 may also include conventional user input devices such as a button, a knob, a wheel, and a sliding switch (not shown) for example. Other components common between this embodiment and that of FIG. 3 are now described.

Figure 3:
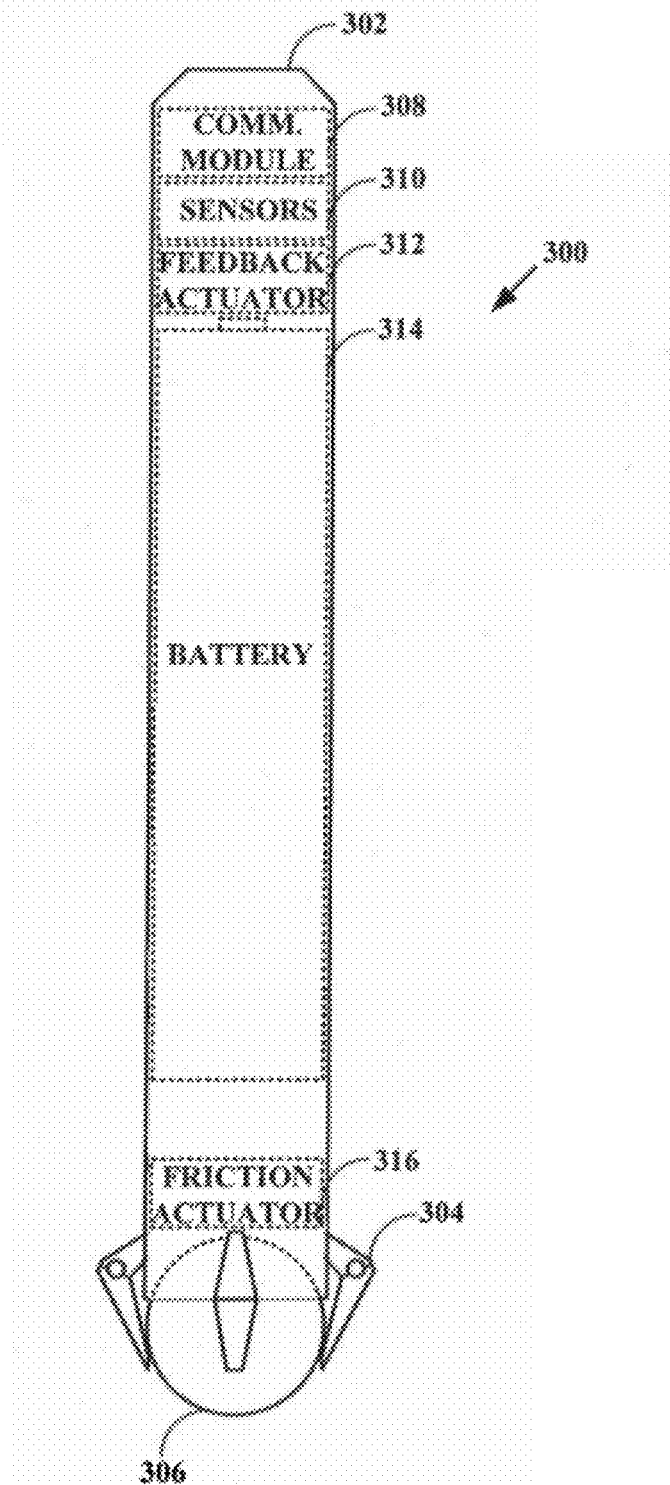
FIG. 3 depicts a stylus according to another embodiment of the present invention.

Referring now to FIG. 3, stylus 300 according to another embodiment is shown. This stylus features a cylindrical housing 302, a contact ball 306, and a contact ball gripping mechanism including prongs 304 and friction force actuator 316 that controls them as previously described. As with FIG. 2, this stylus is preferably powered by a battery 314.

Communications module 308, sensors 310, and feedback actuator 312 are shown in this figure but are also common to the embodiment of FIG. 2. The communications module is preferably a Bluetooth wireless module positioned at the top of housing 302 (though wired communication means are also within the scope of the present invention) that enables information transfer with a computer, such as the portable electronic device having a touch screen display. The communications module acquires stylus operational data (to be described) gathered by onboard control circuitry and transmits it to the computer. The communications module also receives control information from the computer that may govern the type and timing of haptic feedback to be provided by the stylus. For example, the computer may indicate when contact ball 306 is to be free to rotate and when it is not, and to what extent its rotation is to be inhibited by friction actuator 316 and prongs 304.

The stylus operational data may describe all aspects of the stylus that can be reported out, such as its position, orientation, velocity, acceleration, rotation, and whether its contact ball is currently touching anything and if so how forcefully. The operational data is measured by sensors 310 within housing 302 as shown in FIG. 3 (also employed but not shown in FIG. 2) and provided to communications module 308 by control circuitry (not shown). The sensors may be of any number, and of any type known in the art, such as but not limited to a 3-dimensional gyroscope, an accelerometer, and a contact pressure sensor.

In addition to the friction forces described above, the stylus embodiments of FIGS. 2 and 3 may also generate feedback forces for the user. For example, in response to received control signals, feedback actuator 312 may selectively move a mass within the stylus. Battery 314 may be the mass that is moved for example longitudinally within housing 302; motion in other directions is also within the scope of the invention. In this manner, application programs may better interact with the user by linking the manipulation of objects depicted on the touch screen display with the haptic feedback provided by the stylus.

Feedback actuator 312 may exert a force on contact ball 306 to for example pull or push stylus 300 toward or away from the touch screen display surface temporarily. The feedback actuator may for example push a contact pad (not shown) from housing 302 against the contact ball during creation of the feedback force. Such bumps are commonly used to provide the user with a sensation of "height" when a stylus point traverses the edges of graphical user interface objects on the touch screen display, for example. This action may tend to inhibit the rotational freedom of contact ball 306 however, by pushing it into prongs 304, particularly if the contact pad is not a very low friction (i.e. slick) surface. The feedback force and the friction force are therefore interrelated.

To avoid this issue, the embodiments of the present embodiment enable selectively independent control of the feedback forces and the friction forces exerted by the stylus. Friction forces may be precisely controlled by the contact ball gripping mechanism. Any contribution to friction forces caused by the feedback forces operating to press the contact ball against the prongs can be predicted and/or measured, and the intended friction forces can be responsively lessened to counteract those contributions. For example, by lessening the grip the contact ball gripping mechanism has on the contact ball during the time the feedback actuator is exerting a downward force on the contact ball, the net intended friction force is maintained. Similarly, if the feedback actuator is retracting a contact pad away from the contact ball, the contact ball will have space to move slightly away from the prongs, resulting in a more free rotation than was intended. To counteract this, the prongs may be moved toward the contact ball to grip it more tightly until the feedback force abates.

Figure 4:
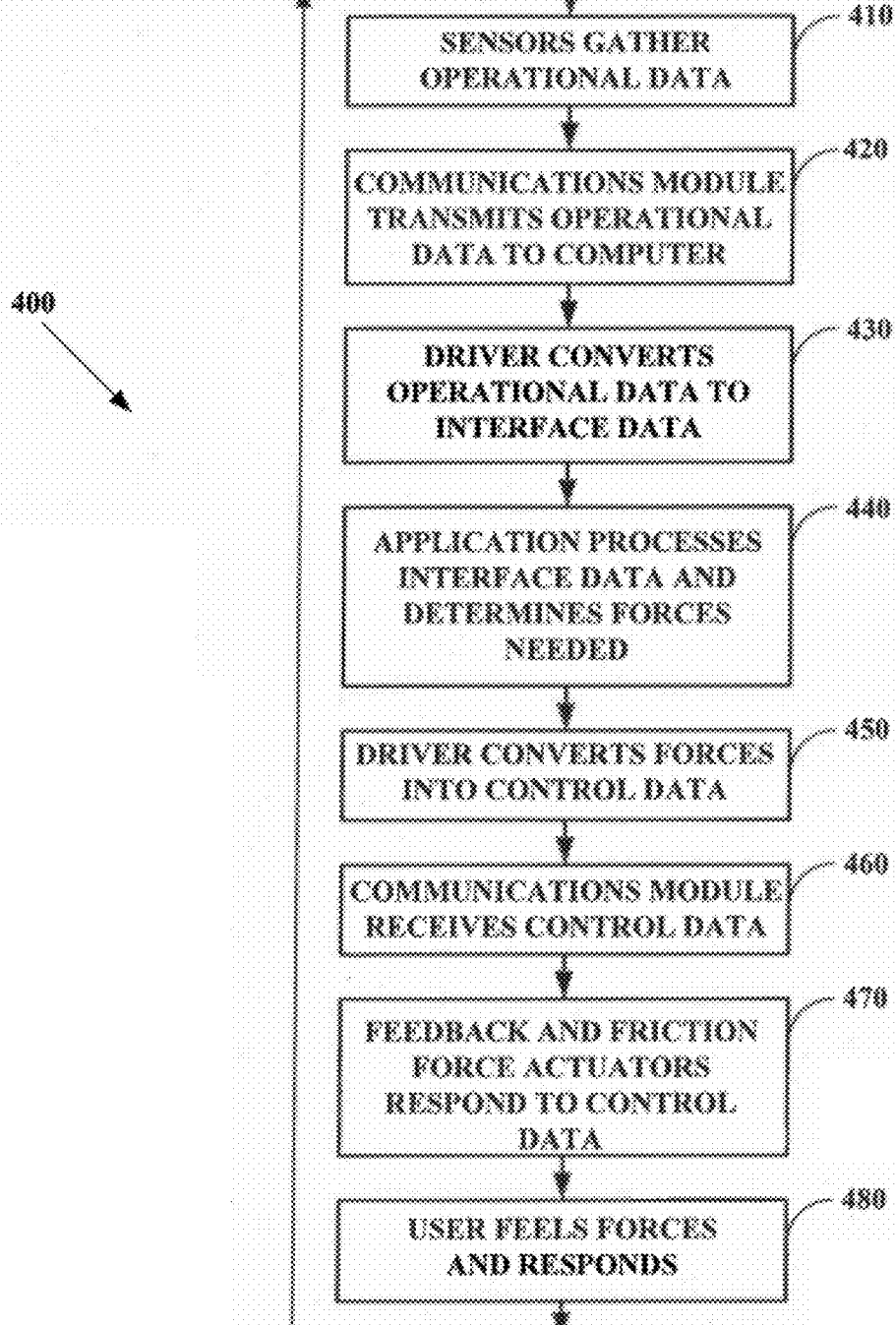
FIG. 4 depicts a flowchart of stylus operation according to embodiments of the present invention.

Referring now to FIG. 4, a flowchart describing the overall operational flow of embodiments of the present invention is described. In step 410, the stylus sensors acquire operational data describing the operating parameters of the stylus, such as position, orientation, velocity and so forth. Next, in step 420 the control circuitry provides the operational data to the communication module for transmission to the computer that is in communication with the stylus. In step 430, driver software executing on the computer receives the stylus operational data and converts it to relevant descriptive interface data that has meaning to an application program. For example, contact pressure and stylus acceleration information may be converted into a touch screen display location being touched by the contact ball, and particular manner in which the contact ball is moving, perhaps indicative of user intent. Then, in step 440, an application program executing on the computer receives the interface data and determines what if any haptic forces should be applied by the stylus as a consequence. For example, the application program may decide to trigger a feedback force "bump" sensation and tighten the grip on the contact ball as it "ascends" an edge of a displayed object visually portrayed as having height, to provide the illusion that the contact point has collided with and is "climbing up onto" the object.

In step 450, the driver software translates these desired forces into control data that will cause the various stylus actuators to generate the feedback and friction forces designated by the application program. In step 460, the computer transmits this control data to the communications module. In step 470, the feedback and friction force actuators responsively trigger to meet the requirements of the application program. In step 480, the user feels the applied forces and may responsively alter the stylus configuration. This process may repeat so the embodiments of the invention provide an ongoing automatic haptic interaction to improve the computer-human interface between the application program and the user. In another embodiment, computer-executable program instructions for implementing the method above are provided via a computer program product.

The embodiments of the invention thus improve the simulation of movement and manipulation of display objects as if in a three-dimensional interactive environment when actually only two-dimensional non-textured touch screen displays are being used. Embodiments may be employed in a variety of particular simulations, which are now described.

The stylus may be beneficial to users who are running game programs as their applications. Games require input from a user typically to control simulated persons and objects, but users of touch screen display devices may not have the same input devices that are available on a regular personal computer or video game machine. Embodiments of the invention may therefore provide a level of input detail not previously available on portable touch screen devices. For example, the stylus may provide operational data denoting the pressure being applied by a user against the touch screen display to indicate an effort level intended, for example in a combat or sports game. Excess pressure may also trigger a warning that the touch screen display may become damaged. Increased friction forces may denote that a game character is becoming fatigued or damaged from a virtual battle. Similarly, rotary motions of the stylus, including stylus rotation and stylus revolution, even if not contacting the display surface, may trigger a game event, such as a character action like turning an object around or looking in different virtual directions. A sudden release of the friction force may be used to indicate that a game event has occurred, such as a door or container has been pried open, or that a sword has sliced through an object.

The stylus may also be beneficial to users who are performing various three-dimensional manipulation tasks on rendered virtual objects. For example, one may "carve" a virtual object with the stylus. The application program may be a CAD tool that depicts an object on the touch screen display. The motion of the contact ball against the friction force may denote the strength being applied by the user to a carving implement, which responsively controls the depth of material removed during each pass of the implement. Similarly, one may build up a virtual object by depositing material at a rate according to the friction force opposed by the user.

Further, while carving an object, embedded knots or voids may be effectively simulated by sudden changes in the friction force required to move the stylus contact ball through these anisotropic regions. For example, an embedded knot may present a sudden increase in the friction force, such that the user may wish to avoid carving through it. This can be used for teaching sculpting, i.e. removal of unwanted material is easy while removal of the desired embedded portion is more difficult. Similarly, a sudden release of the friction force may be used to denote that a void has been found, or that a layer has been removed. Likewise, wood grain may be denoted by a directional dependence of the friction force.

Finally, the stylus may be used with stylus proximity detection tools to help mimic a three-dimensional surface or object even though the contact ball is not contacting a real surface or object. See for example commonly-assigned patent application U.S. Ser. No. 12/948,472 filed on Nov. 17, 2010. A stylus proximity detection tool, which may be in the stylus or in the touch screen display device for example, automatically determines the distance from the contact ball to the display surface. That data is added to the operational data received from the stylus. Thus one may have position detection and much of the stylus interaction described above on a virtual surface or volume without the contact ball touching the surface.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A haptic stylus interface device, comprising:
   a stylus capable of providing feedback forces, and having a surface contact ball capable of rotating in place;
   a communications module enabling information transfer with a computer; and
   a contact ball gripping mechanism that responsively produces a variable contact ball friction force independent of the feedback forces,
   wherein the device enables a gaming interface;
   wherein the contact ball gripping mechanism comprises a set of prongs holding the contact ball in a grip of variable firmness; and
   wherein a rotary motion of the haptic stylus when not contacting a surface generates a signal to the gaming interface to trigger a game event.

2. The device of claim 1 further comprising a sensor that measures operational data including at least one of position, orientation, velocity, acceleration, and rotation.

3. The device of claim 1 further comprising a feedback actuator that selectively produces the feedback forces oriented with respect to a housing in at least one of a longitudinal direction and an orthogonal direction.

4. The device of claim 1 wherein the communications module further includes control circuitry that gathers the operational data for transmission, and receives control information enabling responsive actuator activation.

5. The device of claim 4 further comprising driver software executing on the computer, that manages at least one of operational data and control information for a game application executing on the computer.

6. The device of claim 1 wherein stylus pressure indicates a game effort level.

7. The device of claim 1 wherein excess stylus pressure triggers a damage warning.

8. The device of claim 1 wherein increased friction forces indicate at least one of fatigue and damage, to a game character.

9. The device of claim 1 wherein a sudden friction force change denotes a game event occurrence.

10. The device of claim 1 wherein the contact ball gripping actuator selectively completely stops contact ball rotation.

11. The device of claim 1 wherein the device is configured for operation as a trackball.

12. The device of claim 1 wherein the device simulates the manipulation of objects depicted on a display, including at least one of a game object and a game character.

13. The device of claim 3 further comprising a housing containing a sensor, the feedback actuator, the communications module, and the contact ball gripping mechanism.

14. The device of claim 12 wherein the housing is one of cylindrically shaped and conically shaped with a larger end having the contact ball and contact ball gripping mechanism.

15. The device of claim 1 further comprising:
   a feedback actuator that produces the feedback forces; and
   a braking pad that the feedback actuator presses against the contact ball when friction forces and longitudinal feedback forces are interrelated.

16. The device of claim 1 further comprising user input devices including at least one of a button, a wheel, a knob, and a sliding switch.

17. A computer interface for providing interaction between a computer and a user, comprising:
   a computer; and
   a haptic stylus that communicates with the computer and provides independent feedback and friction surface contact forces to a user, enabling a game interface;
   wherein a rotary motion of the haptic stylus when not contacting a surface generates a signal to the gaming interface to trigger a game event.

18. A method for providing interaction between a computer and a user, comprising:
   transferring information between a computer and a stylus having a contact ball capable of rotating in place; and
   selectively providing independent feedback and friction forces to a user with the stylus, enabling a game interface;
   wherein the stylus comprises a contact ball gripping mechanism having a set of prongs holding a contact ball in a grip of variable firmness; and
   wherein a rotary stylus motion of the stylus when not contacting a display surface generates a signal to the gaming interface to trigger a game event.

19. A computer program product comprising a machine-readable medium tangibly embodying non-transitory program instructions thereon that, when executed by a computer, cause the computer to:
   transfer information between a computer and a stylus having a contact ball capable of rotating in place; and
   selectively provide independent feedback and friction forces to a user with the stylus, enabling a game interface;
   wherein the stylus comprises a contact ball gripping mechanism having a set of prongs holding a contact ball in a grip of variable firmness; and
   wherein a rotary motion of the stylus when not contacting a surface generates a signal to the gaming interface to trigger a game event.

* * * * *